United States Patent
Min

(10) Patent No.: US 9,296,371 B2
(45) Date of Patent: Mar. 29, 2016

(54) POSITION ADJUSTABLE PEDAL

(71) Applicants: Hyundai Motor Company, Seoul (KR); Kia Motors Corporation, Seoul (KR)

(72) Inventor: Jeong Seon Min, Gwangju (KR)

(73) Assignees: Hyundai Motor Company, Seoul (KR); Kia Motor Corporation, Seoul (KR)

( * ) Notice: Subject to any disclaimer, the term of this patent is extended or adjusted under 35 U.S.C. 154(b) by 0 days.

(21) Appl. No.: 14/312,150

(22) Filed: Jun. 23, 2014

(65) Prior Publication Data

US 2015/0151724 A1 Jun. 4, 2015

(30) Foreign Application Priority Data

Dec. 3, 2013 (KR) .......................... 10-2013-0149374

(51) Int. Cl.
*B60T 7/06* (2006.01)
*G05G 1/44* (2008.04)
*H01H 1/26* (2006.01)

(52) U.S. Cl.
CPC ... *B60T 7/06* (2013.01); *G05G 1/44* (2013.01); *H01H 1/26* (2013.01); *Y10T 74/20528* (2015.01)

(58) Field of Classification Search
CPC ................... Y10T 74/20528; Y10T 74/20534; Y10T 74/2054; Y10T 74/20888; B60T 7/06; B60T 7/065; B60T 7/045; B60T 7/04; G05G 1/40; G05G 1/405; G05G 1/44; G05G 1/445; G05G 1/50; G05G 1/30; H01H 21/26
USPC ............. 200/86.5, 61.29, 61.89; 74/512–514, 74/560
See application file for complete search history.

(56) References Cited

U.S. PATENT DOCUMENTS

| 1,203,955 | A | * | 11/1916 | Adams | 74/513 |
| 1,255,220 | A | * | 2/1918 | Petry | 74/512 |
| 1,468,571 | A | * | 9/1923 | McGinley | 74/513 |
| 1,846,017 | A | * | 2/1932 | Albinson | 188/357 |
| 2002/0007693 | A1 | * | 1/2002 | Mueller et al. | 74/512 |
| 2002/0078784 | A1 | * | 6/2002 | Hayashihara | 74/512 |
| 2002/0179359 | A1 | * | 12/2002 | Kawai et al. | 180/274 |
| 2003/0084749 | A1 | * | 5/2003 | Orr et al. | 74/560 |
| 2005/0104447 | A1 | * | 5/2005 | Okuma et al. | 303/158 |
| 2009/0223319 | A1 | | 9/2009 | Choi | |
| 2010/0140008 | A1 | * | 6/2010 | Kim et al. | 180/271 |

FOREIGN PATENT DOCUMENTS

JP 2001-206205 A 7/2001
JP 2001-278017 (A) 10/2001

(Continued)

*Primary Examiner* — Daniel Yabut
(74) *Attorney, Agent, or Firm* — Morgan, Lewis & Bockius LLP

(57) ABSTRACT

A position adjustable pedal may include a pedal member configured to be fixedly mounted on a vehicle body and have a front end with a hinge shaft and a plurality of insertion holes formed around the hinge shaft, a switch bracket configured to be rotatably mounted on the hinge shaft of the pedal member, provided with at least one fixing hole corresponding to the plurality of insertion holes, and fixed to the pedal member by a fixing pin inserted into any one of the plurality of insertion holes and any one of the at least one fixing hole, and a pedal arm configured to be rotatably mounted on the same hinge shaft as the switch bracket, provided with a plurality of clevis holes corresponding to a clevis extending from a booster, and connected to the booster by a clevis pin inserted into any one of the plurality of clevis holes and the clevis.

8 Claims, 6 Drawing Sheets

(56) References Cited

FOREIGN PATENT DOCUMENTS

| KR | 1997-0026225 A | 6/1997 |
| KR | 1998-0007762 U | 4/1998 |
| KR | 1998-055402 (A) | 9/1998 |
| KR | 1999-007617 (U) | 2/1999 |
| KR | 1019990035361 (A) | 5/1999 |
| KR | 2003-0069634 A | 8/2003 |
| KR | 1020050026235 (A) | 3/2005 |

* cited by examiner

POSITION ADJUSTABLE PEDAL

CROSS-REFERENCE(S) TO RELATED APPLICATION

The present application claims priority of Korean Patent Application Number 10-2013-0149374 filed on Dec. 3, 2013, the entire contents of which application are incorporated herein for all purposes by this reference.

BACKGROUND OF INVENTION

1. Field of Invention

The present invention relates to a technology of adjusting a position of a pedal pad, and more particularly, to a position adjustable pedal capable of adjusting a pad position of a brake pedal.

2. Description of Related Art

Generally, a pedal mounted in a vehicle may be classified into a brake pedal to stop or decelerate a driving vehicle, an accelerator pedal to accelerate a vehicle, and the like.

The brake pedal and the accelerator pedal are adjacently mounted to each other due to the driver's convenience and the restriction of a mounting space and have the similar operation direction and operation feeling, and therefore, are apt to be wrongly operated. Therefore, when a driver wrongly operates the brake pedal and the accelerator pedal by mistake which arises from his/her carelessness, it is highly likely to bring about a safety accident and since a driver operates the brake pedal and the accelerator pedal with careful care, the fatigue of the driver accumulated.

To solve the above problems, as illustrated in FIG. 1, a step having a predetermined interval needs to be formed between the accelerator pedal 10 and the brake pedal 20 to differentiate the accelerator pedal 10 and the brake pedal 20 from each other.

However, in the case of the existing accelerator pedal 10, a pedal arm 12 is rotatably mounted and fixed on a vehicle body and a pad 14 is mounted on the pedal arm 12 and is also fixedly mounted on a floor of the vehicle body, and therefore, an operation position of the pad 14 may not be changed.

Further, in the case of the existing brake pedal 20, the pedal arm 22 is rotatably mounted on a vehicle body bracket 24, and an initial setting distance of a booster connected to the pedal arm 22 may not be arbitrarily changed and thus the operation position of a pad 26 is not easily changed.

As such, as the operation positions of the pads of the accelerator pedal 10 and the brake pedal 20 are not changed, the step between the two pedals is fixed, and thus may not be adjusted to a driver's figure. Therefore, when the step between the accelerator pedal 10 and the brake pedal 20 is set to be too large, it is inconvenient to operate the pedal and when the step between the accelerator pedal 10 and the brake pedal 20 is set to be too small, it is difficult to differentiate the brake pedal 20 from the accelerator pedal 10.

Therefore, there is a need to develop a pedal having a structure in which the step between the accelerator pedal and the brake pedal may be arbitrarily adjusted at a driver's desired position so as to improve driver's convenience and vehicle marketability and stability.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a position adjustable pedal having a structure in which a step between an accelerator pedal and a brake pedal may be arbitrarily adjusted to a driver's desired position by adjusting a position of a vehicle pedal so as to improve driver's convenience, vehicle marketability, and driving stability.

According to various aspects of the present invention, there is provided a position adjustable pedal, including: a pedal member configured to be fixedly mounted on a vehicle body and have a front end with a hinge shaft and a plurality of insertion holes formed around the hinge shaft, a switch bracket configured to be rotatably mounted on the hinge shaft of the pedal member, provided with at least one fixing hole corresponding to the plurality of insertion holes, and fixed to the pedal member by a fixing pin inserted into any one of the plurality of insertion holes and any one of the at least one fixing hole, and a pedal arm configured to be rotatably mounted on the same hinge shaft as the switch bracket, provided with a plurality of clevis holes corresponding to a clevis extending from a booster, and connected to the booster by a clevis pin inserted into any one of the plurality of clevis holes and the clevis.

The plurality of insertion holes of the pedal member may be formed around the hinge shaft along a rotating radial direction with respect to the hinge shaft. The fixing pin which is inserted into any one insertion hole of the pedal member and any one fixing hole of the switch bracket may be disposed at a predetermined distance from the pedal arm so that the fixing pin is not disposed within a rotating range of the pedal arm.

A temporary assembling hole may be formed at a front surface portion of the switch bracket in a front and back direction and one end of the pedal arm may be provided with a temporary assembling part which protrudes forward to be inserted into the temporary assembling hole of the switch bracket, and the temporary assembling part may be provided with a support hole which penetrates in a substantially horizontal direction to the front surface portion of the switch bracket. The temporary assembling part of the pedal arm may protrude into the temporary assembling hole of the switch bracket so that the support hole is exposed to an outside of the switch bracket when the temporary assembling hole of the switch bracket is inserted from a back of the switch bracket toward a front of the switch bracket.

One end of the switch bracket may be mounted on the hinge shaft of the pedal member and the other end of the switch bracket may be provided with a stop switch, and the pedal arm may be fixedly provided with a connection member which corresponds to the stop switch of the switch bracket.

The position adjustable pedal may further include an elastic member having one end connected to the pedal arm or the connection member fixedly mounted on the pedal arm and the other end connected to the switch bracket to provide an elastic restoring force to the pedal arm.

The plurality of clevis holes of the pedal arm may be formed along a rotating radial direction with respect to the hinge shaft. The plurality of clevis holes of the pedal arm may be repeatedly provided with ruggedness at a predetermined interval along a rotating radial direction with respect to the hinge shaft.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
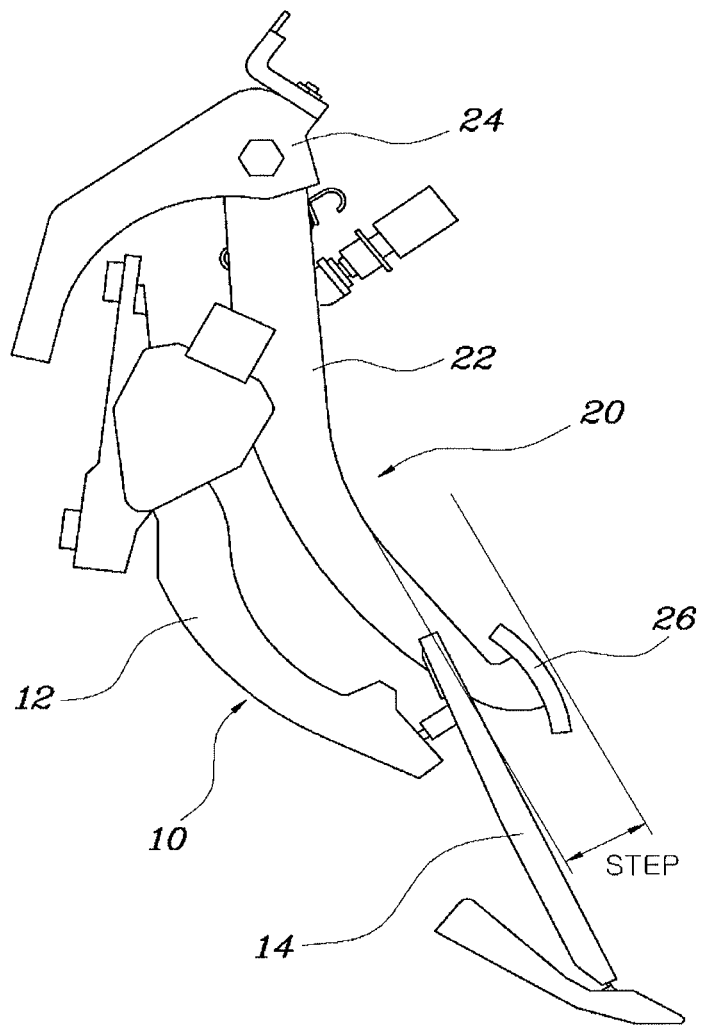
FIG. 1 is a diagram illustrating an accelerator pedal and a brake pedal according to the related art.
Figure 2:
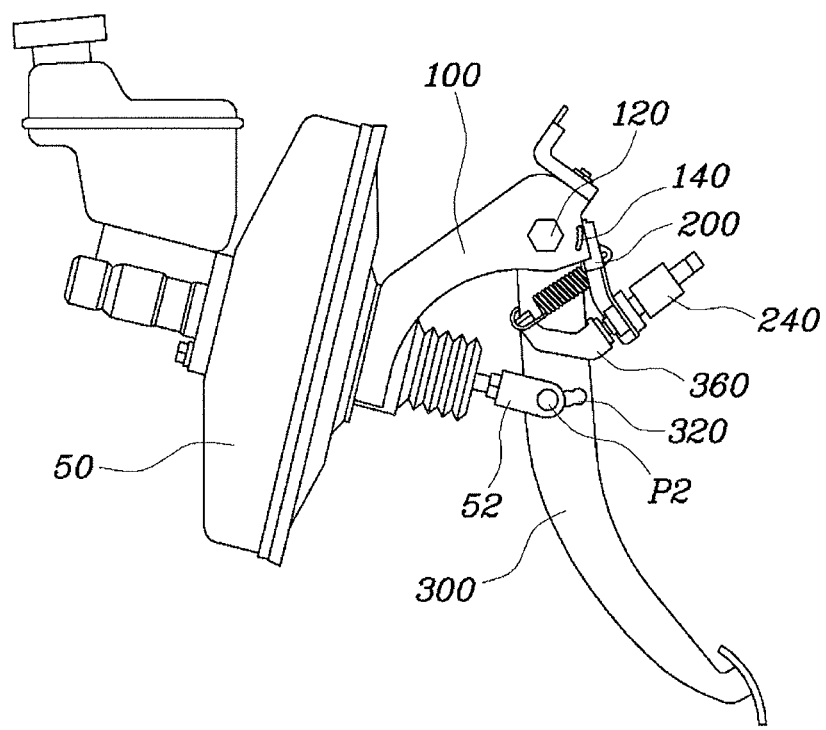
FIG. 2 is a diagram illustrating an exemplary position adjustable pedal according to the present invention.
Figure 3:
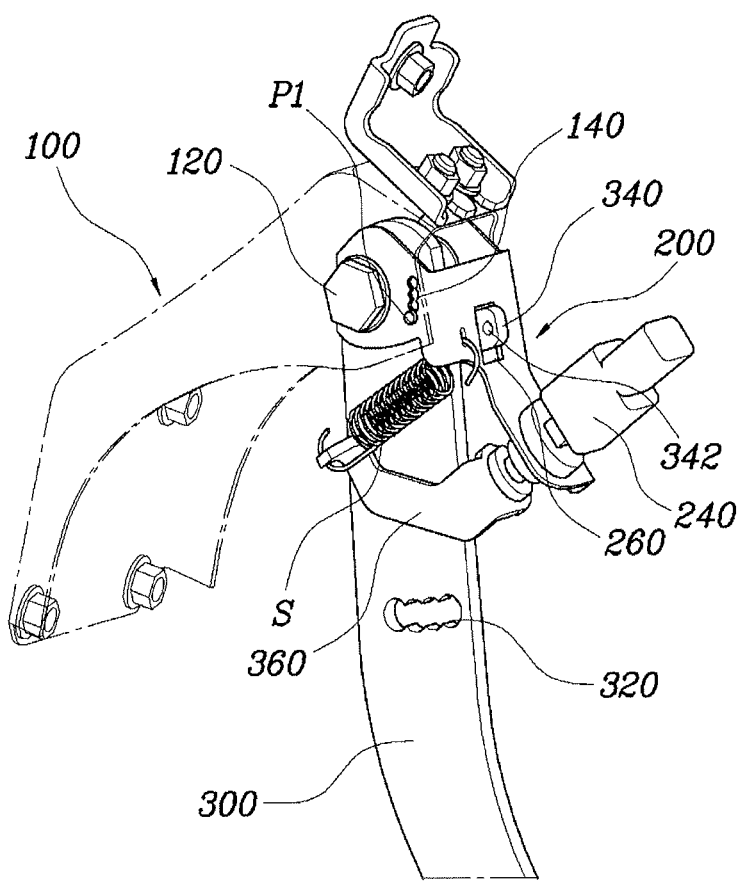
FIG. 3 is a perspective view of the position adjustable pedal illustrated in FIG. 2.
Figure 4:
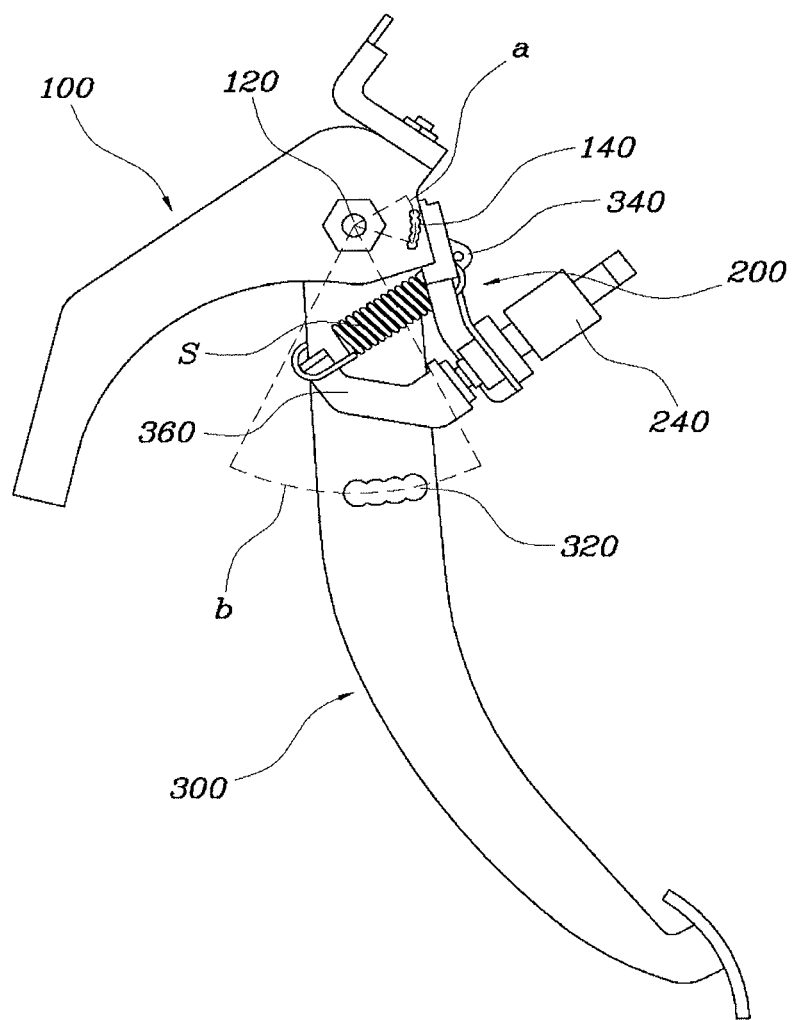
FIGS. 4 to 6 are diagrams illustrating the position adjustable pedal illustrated in FIG. 2.
Figure 5:
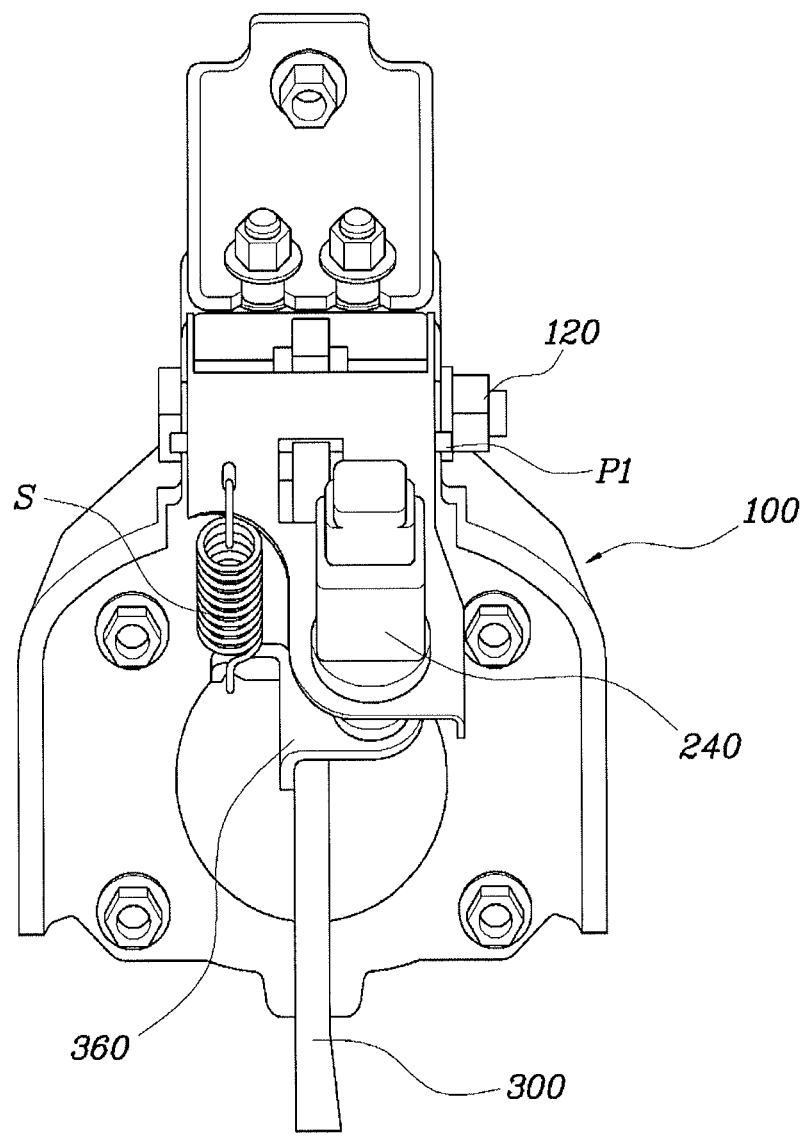
Figure 6:
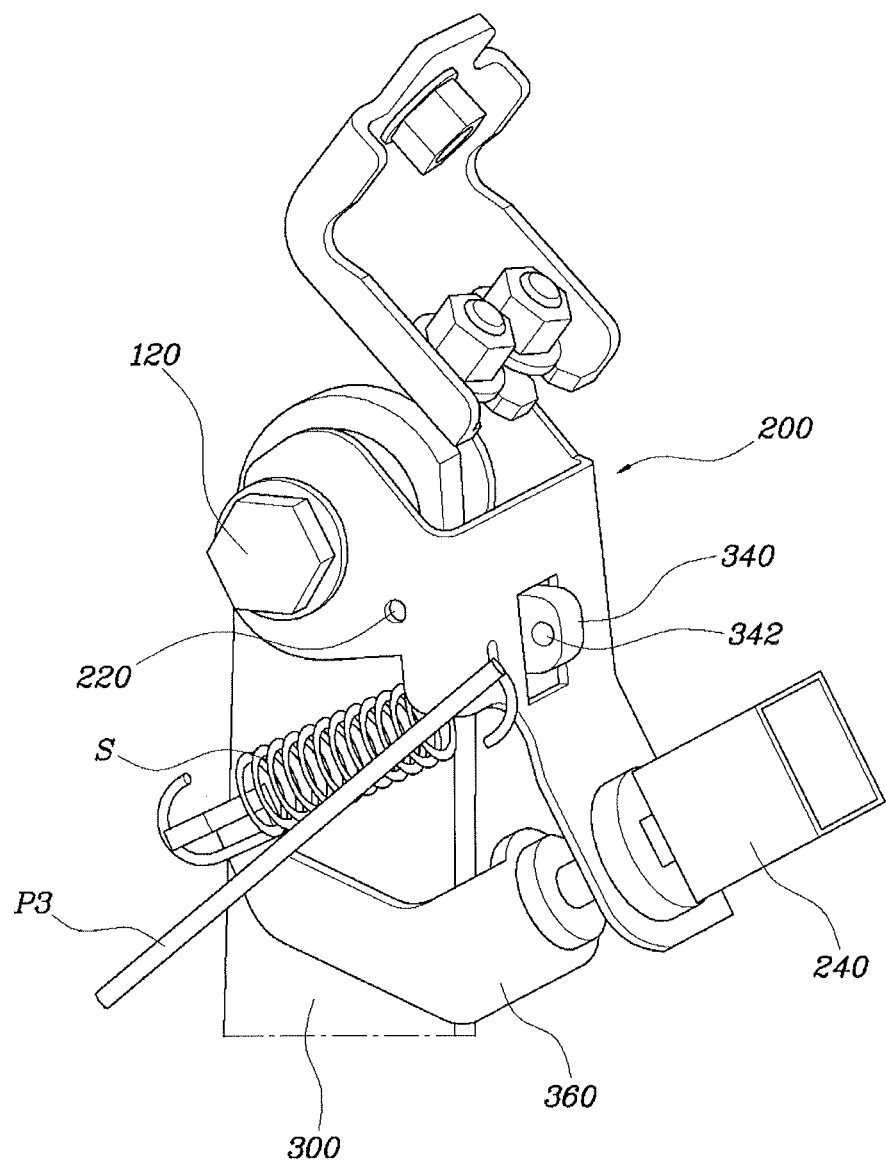

FIG. 2 is a diagram illustrating a position adjustable pedal according to an exemplary embodiment of the present invention, FIG. 3 is a perspective view of the position adjustable pedal illustrated in FIG. 2, and FIGS. 4 to 6 are diagrams illustrating the position adjustable pedal illustrated in FIG. 2. The position adjustable pedal according to various embodiments of the present invention includes: a pedal member 100 configured to be fixedly mounted on a vehicle body and have a front end mounted on or provided with a hinge shaft 120 and a plurality of insertion holes 140 formed around the hinge shaft 120; a switch bracket 200 configured to be rotatably mounted on the hinge shaft 120 of the pedal member 100, provided with fixing holes 220 corresponding to the plurality of insertion holes 140, and fixed to the pedal member 100 by a fixing pin P1 inserted into any one of the plurality of insertion holes 140 and the fixing hole 220; and a pedal arm 300 configured to be rotatably mounted on the same hinge shaft 120 as the switch bracket 200, provided with a plurality of clevis holes 320 or the like corresponding to a clevis 52 extending from a booster 50, and connected to the booster 50 by a clevis pin P2 inserted into any one of the plurality of clevis holes 320 and the clevis 52.

The position adjustable pedal is configured to include the pedal member 100, the switch bracket 200, and the pedal arm 300 and may be applied to a brake pedal. Further, the position adjustable pedal may be variously modified depending on a configuration of accessories, and an optimally designed brake pedal will be mainly described herein as an example.

The present invention relates to arbitrarily adjusting a position of the pedal arm 300, and in particular, may be applied to the brake pedal. Generally, in the case of the brake pedal, the pedal arm 300 is rotatably mounted to the vehicle body and the booster 50 is pushed by the rotation of the pedal arm 300, such that a stop operation of the vehicle may be made.

To adjust a position of the brake pedal, since the structure of the booster 50 is limited to adjust a distance between the booster 50 and the pedal arm 300, even though the position of the pedal arm 300 is changed, a stop switch 240 and a pedal arm 300 which transfer an operation signal of the brake and thus an on/off timing of the stop switch 240 may be changed.

To solve the above problem and/or other problems, according to various embodiments of the present invention, the pedal arm 300 and the switch bracket 200 move together at the time of adjusting the position of the brake pedal to be able to maintain the gap between the stop switch 240 and the pedal arm 300 and arbitrarily adjust the position of the pedal arm 300 to the driver's desired position.

The position adjustable pedal according to various embodiments of the present invention is configured so that the switch bracket 200 and the pedal arm 300 are rotatably mounted on the pedal member 100 fixedly mounted on a lower portion of a dash panel of the vehicle body and the hinge shaft 120 mounted on the pedal member 100. As such, the switch bracket 200 and the pedal arm 300 are mounted on the hinge shaft 120 and thus rotate based on the same shaft at the time of adjusting the position of the pedal arm 300 to be able to maintain the gap between the pedal arm 300 and the stop switch 240 mounted on the switch bracket 200.

First, the pedal member 100 according to various embodiments of the present invention is fixedly mounted on the lower portion of the dash panel of the vehicle body and is provided with the hinge shaft 120 and the plurality of insertion holes 140 are mounted around the hinge shaft 120. Herein, the insertion hole 140 may be formed in a single long groove but is repeatedly provided with ruggedness at a predetermined interval, such that the pedal arm 300 may be more precisely adjusted.

Position adjusting ends of the pedal arm 300 may be adjusted as many as the number of insertion holes 140 which is formed in the pedal member 100 and a fixing pin P1 is inserted into a specific or selected insertion hole 140 and a fixing hole 220 of the switch bracket 200 to fix the switch bracket 200 to the pedal member 100.

Herein, the plurality of insertion holes 140 of the pedal member 100 may be mounted around the hinge shaft 120 along a rotating radial (e.g., "a" in FIG. 4) direction based on the hinge shaft 120.

The pedal arm 300 and the switch bracket 200 according to various embodiments of the present invention are configured to be rotatably mounted by the same hinge shaft 120. That is, the switch bracket 200 rotates based on the hinge shaft 120 of the pedal member 100 as an original point and thus the position thereof may be adjusted, in which after the switch bracket 200 rotates and thus the position thereof is adjusted to make the fixing hole 220 of the switch bracket 200 correspond to any one of the plurality of insertion holes 140 mounted on the pedal member 100, the switch bracket 200 is fixed to the pedal member 100 by the fixing pin P1 which is inserted into the insertion hole 140 and the fixing hole 220.

As such, the switch bracket 200 rotates based on the hinge shaft 120 of the pedal member 100 and therefore the fixing hole 220 mounted on the switch bracket 200 rotatably moves based on the hinge shaft 120. Therefore, the insertion hole 140 of the pedal member 100 is also mounted along the rotating radial (e.g., "a" in FIG. 4) direction based on the hinge shaft 120, and thus the fixing hole 220 may be disposed within a range in which the insertion hole 140 of the pedal member 100 is formed even though the switch bracket 200 is rotatably adjusted.

By doing so, even though the switch bracket 200 rotates in the pedal member 100, the fixing pin P1 may be inserted into the fixing hole 220 and the insertion hole 140, such that the switch bracket 200 may be fixed to the pedal member 100 at any position.

Meanwhile, the fixing pin P1 which is inserted into the insertion hole 140 of the pedal member 100 and the fixing hole 220 of the switch bracket 200 may be disposed at a predetermined distance from the pedal arm 300 so that the fixing pin P1 is not disposed within a rotating range of the pedal arm 300.

When the fixing pin P1 which is inserted into the insertion hole 140 of the pedal member 100 and the fixing hole 220 of the switch bracket 200 is disposed within the rotating range of the pedal arm 300, the pedal arm 300 is locked into the fixing pin P1 when the pedal is operated and thus may not rotate. Further, when the pedal arm 300 is disposed on a path of the fixing pin P1 which is inserted into the insertion hole 140 of the pedal member 100 and the fixing hole 220 of the switch bracket 200, an assembling of the pedal member and the switch bracket is not made. Therefore, the pedal arm 300 and the fixing pin P1 may be disposed to be spaced apart from each other.

Meanwhile, a temporary assembling hole 260 may be formed at a front surface portion of the switch bracket 200 in a front and back direction, one end of the pedal arm 300 may be provided with a temporary assembling part 340 which protrudes forward to be inserted into the temporary assembling hole 260 of the switch bracket 200, and the temporary assembling part 340 may be provided with a support hole 342 which penetrates in a horizontal direction to the front surface portion of the switch bracket 200.

Here, the temporary assembling part 340 of the pedal arm 300 may protrude so that the support hole 342 is exposed to the outside at the time of inserting the temporary assembling hole 260 of the switch bracket 200 toward the front from the back.

This is to simultaneously rotate the switch bracket 200 and the pedal arm 300 at the time of adjusting the position of the pedal arm 300, and the switch bracket 200 is provided with the temporary assembling hole 260 and the pedal arm 300 is provided with the temporary assembling part 340 which protrudes by penetrating through the temporary assembling hole 260. Here, the temporary assembling part 340 is provided with the support hole 342, in which the support hole 342 is formed to be inserted with a separate tool, a pin P3, or the like.

The switch bracket 200 and the pedal arm 300 according to various embodiments of the present invention are connected to each other by the same hinge shaft 120, in which the switch bracket 200 is connected to the pedal member 100 through the fixing pin P1 and thus the position thereof is fixed and the pedal arm 300 is connected to the clevis 52 of the booster 50 through the clevis pin P2 and thus the position thereof is fixed. In this state, when the fixing pin P1 is separated from the clevis pin P2 to adjust the position of the pedal arm 300, the switch bracket 200 and the pedal arm 300 differently rotates from each other to change a maintenance gap between the switch bracket 200 and the pedal arm 300.

Therefore, the pedal arm 300 is fixed to the switch bracket 200 through the temporary assembling part 340 of the pedal arm 300 which is exposed to the outside by penetrating through the temporary assembling hole 260 of the switch bracket 200 to simultaneously rotate the pedal arm 300 and the switch bracket 200. That is, the tool or the pin P3 is inserted into the support hole 342 disposed in the temporary assembling part 340 so that the temporary assembling part 340 is supported to the switch brake 200. By doing so, when the pedal arm 300 rotates, the switch bracket 200 may rotate together and as the tool inserted into the temporary assembling part 340 presses the switch bracket 200 by an elastic member S which is provided to recover the rotating pedal arm 300 to be described below, the pedal arm 300 and the switch bracket 200 may simultaneously rotate.

Configurations, including shapes and sizes, of the temporary assembling part 340 and the temporary assembling hole 260 may be readily varied and may depend on shapes of the switch bracket 200 and the pedal arm 300.

Meanwhile, one end of the switch bracket 200 may be mounted on the hinge shaft 120 of the vehicle body member 100, the other end thereof may be provided with the stop switch 240, and the pedal arm 300 may be fixedly provided with a connection member 360 which corresponds to the stop switch 240 of the switch bracket 200.

That is, as the stop switch 240 mounted on the switch bracket 200 and the connection member 360 of the pedal arm 300 contact each other and are spaced apart from each other, apparatuses, such as a brake, are operated and the gap between the stop switch 240 and the connection member 360 needs to be constantly maintained at all times.

The connection member 360 does not contact the stop switch 240 until the switch bracket is applied with an external force from an elastic member S having one end connected to the pedal arm 300 or the connection member 360 fixedly mounted on the pedal arm 300 and the other end connected to the switch bracket 200 to provide an elastic restoring force to the rotating pedal arm 300.

As such, the stop switch 240 of the switch bracket 200 and the connection member 360 of the pedal arm 300 contact each other by the elastic member S and the fixing pin P1 is separated from the clevis pin P2, such that when the pedal arm 300 and the switch bracket 200 rotate in the pedal member 100, the pedal arm 300 and the switch bracket 200 may rotate together.

Meanwhile, the clevis hole 320 of the pedal arm 300 may be formed in plural along a rotating radial (e.g., "b" in FIG. 4) direction based on the hinge shaft 120.

According to various embodiments of the present invention, the position adjustable pedal is to adjust only the position of the pedal arm 300 while the position of the booster 50 is maintained as it is at the time of adjusting the position of the pedal arm 300 and needs to be configured to smoothly apply a pressure in an operation direction of the booster 50 even though the position of the pedal arm 300 is changed at a position at which the booster 50 is fixed.

To this end, the clevis hole 320 of the pedal arm 300 is formed along the rotating radial (e.g., "b" in FIG. 4) direction based on the hinge shaft 120 and thus even though the rotation of the pedal arm 300 is adjusted, the clevis 52 may be positioned within the range in which the clevis hole 320 is formed and thus the position of the pedal arm 300 may be changed even in the state in which the position of the booster 50 is fixed.

Meanwhile, the clevis hole 320 of the pedal arm 300 may be repeatedly provided with ruggedness at a predetermined interval along the rotating radial (e.g., "b" in FIG. 4) direction based on the hinge shaft 120.

The position control ends of the pedal arm 300 may be adjusted as many as the number of clevis holes 320 which is formed in the pedal arm 300. That is, as the number of clevis holes 320 is large and the spaced distance between the clevis holes 320 is narrow, the pedal arm 300 may be precisely adjusted.

To this end, the clevis hole 320 is repeatedly formed with ruggedness and thus the pedal arm 300 may be adjusted to have a larger number of steps within a width of the pedal arm 300.

Here, the plurality of clevis grooves 320 of the pedal arm 300 and the plurality of insertion holes 140 of the pedal member 100 may be formed in the same number and be formed in the same rotating radius based on the hinge shaft 120, such that the pedal arm 300 and the switch bracket 200 which rotate based on the hinge shaft 120 may be fixed at the same rotating position.

Describing a method for adjusting a pedal using the position adjustable pedal according to various embodiments of the present invention, the pedal arm 300 and the switch bracket 200 are rotatably mounted on the hinge shaft 120 of the pedal member 100 in an initial state and the fixing pin P1 is inserted into the specific or selected insertion hole 140 of the pedal member 100 and the fixing hole 220 of the switch bracket 200 to fix the switch bracket 200 to the pedal member 100. Further, the pedal arm 300 is connected to the clevis groove 320 through the clevis pin P2 which is inserted into the clevis 52 extending from the booster 50 and rotates only by a pedal effort of a passenger.

In this state, to adjust the position of the pedal arm 300, the separate pin P3 or tool is inserted into the support hole 342 of the temporary assembling part 340 of the pedal arm 300 which is exposed penetrating through the temporary assembling hole 260 of the pedal member 100 so that the pedal arm 300 does not separately rotate from the switch bracket 200. As such, the pedal arm 300 and the switch bracket 200 may simultaneously rotate and the fixing pin P1 which is connected to the switch bracket 200 and the vehicle body member 100 is separated from the clevis pin P1 which is connected to the pedal arm 300 and the clevis 52 of the booster 50 to rotate the pedal arm 300 and the switch bracket 200.

As such, the pedal arm 300 is adjusted to rotate forward or backward based on the hinge shaft 120 as an original point and then the fixing pin P1 may be inserted into the insertion hole 140 of the pedal member 100 and the fixing hole 220 of the switch bracket 200 and the clevis hole 320 of the pedal arm 300 is connected to the clevis 52 through the clevis pin P2 to fix the rotating positions of the pedal arm 300 and the switch bracket 200.

As described above, the pedal arm 300 and the switch bracket 200 are rotatably mounted on the hinge shaft 120 of the pedal member 100, and the fixing pin P1 connected to the pedal member 100 and the switch bracket 200 is separated from the clevis pin P2 connected to the pedal arm 300 and the clevis 52 of the booster 50, the pedal arm 300 and the switch bracket 200 are rotatably adjusted, as desired, based on the hinge point 120 as an original point, and then each pin is assembled, thereby adjusting the position of the pedal arm 300.

Therefore, the step between the accelerator pedal and the brake pedal may be arbitrarily adjusted at the driver's desired position by adjusting the position of the vehicle pedal, thereby improving the driver's convenience, the vehicle marketability, and the driving stability.

In particular, the position of the pedal arm may be adjusted without changing the gap between the pedal arm and the stop switch and the setting distance between the pedal arm and the booster, thereby adjusting the position of the pedal arm and then normally performing the operation of the pedal.

For convenience in explanation and accurate definition in the appended claims, the terms "front" or "back", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A position adjustable pedal, comprising:
    a pedal member configured to be fixedly mounted on a vehicle body and to have a front end with a hinge shaft and a plurality of insertion holes formed around the hinge shaft along a rotating radial direction with respect to the hinge shaft;
    a switch bracket configured to be rotatably mounted on the hinge shaft of the pedal member, provided with at least one fixing hole corresponding to the plurality of insertion holes, and fixed to the pedal member by a fixing pin inserted into any one of the plurality of insertion holes and any one of the at least one fixing hole; and
    a pedal arm configured to be rotatably mounted on the hinge shaft, provided with a plurality of clevis holes corresponding to a clevis extending from a booster, and connected to the booster by a clevis pin inserted into any one of the plurality of clevis holes and the clevis.

2. The position adjustable pedal of claim 1, wherein the fixing pin inserted into the any one insertion hole of the pedal member and the any one fixing hole of the switch bracket is disposed at a predetermined distance from the pedal arm so that the fixing pin is not disposed within a rotating range of the pedal arm.

3. The position adjustable pedal of claim 1, wherein:
    a temporary assembling hole is formed at a front surface portion of the switch bracket in a front and back direction, and
    a first end of the pedal arm is provided with a temporary assembling part protruding forward to be inserted into the temporary assembling hole of the switch bracket, and the temporary assembling part is provided with a support hole penetrating in a substantially horizontal direction to the front surface portion of the switch bracket.

4. The position adjustable pedal of claim 3, wherein the temporary assembling part of the pedal arm protrudes into the temporary assembling hole of the switch bracket so that the support hole is exposed to an outside of the switch bracket when the temporary assembling hole of the switch bracket is inserted from a back of the switch bracket toward a front of the switch bracket.

5. The position adjustable pedal of claim 1, wherein:
    a first end of the switch bracket is mounted on the hinge shaft of the pedal member and a second end of the switch bracket is provided with a stop switch, and
    the pedal arm is fixedly provided with a connection member corresponding to the stop switch of the switch bracket.

6. The position adjustable pedal of claim 5, further comprising:
    an elastic member having a first end connected to the pedal arm or the connection member fixedly mounted on the pedal arm and a second end connected to the switch bracket to provide an elastic restoring force to the pedal arm.

7. The position adjustable pedal of claim 1, wherein the plurality of clevis holes of the pedal arm is formed along a rotating radial direction with respect to the hinge shaft.

8. The position adjustable pedal of claim 1, wherein the plurality of clevis holes of the pedal arm is repeatedly provided at a predetermined interval along a rotating radial direction with respect to the hinge shaft.

* * * * *